United States Patent [19]

Naves

[11] 4,252,482
[45] Feb. 24, 1981

[54] RAILWAY CAR COUNTER-BALANCED TILTING DECK

[75] Inventor: David G. Naves, Alexandria, Va.

[73] Assignee: Pullman Incorporated, Chicago, Ill.

[21] Appl. No.: 955,274

[22] Filed: Oct. 26, 1978

[51] Int. Cl.³ .................. B60P 3/08; B61D 3/04; B61D 3/16

[52] U.S. Cl. .................. 410/27; 14/16.1; 105/370; 105/375; 404/1

[58] Field of Search .................. 14/16.1, 71.1, 71.3; 105/368 R, 370, 375, 378, 458; 211/188, 194; 248/345; 280/179 A; 296/1 A; 404/1, 1 R; 410/27

[56] References Cited

U.S. PATENT DOCUMENTS

| 2,975,730 | 3/1961 | Nichol | 280/179 A X |
|---|---|---|---|
| 3,205,836 | 9/1965 | Wojcikowski | 296/1 A X |
| 3,426,704 | 2/1969 | Blunden | 105/370 X |
| 3,866,543 | 2/1975 | Richard | 105/370 X |
| 3,911,831 | 10/1975 | Blunden | 105/368 X |
| 4,119,042 | 10/1978 | Naves et al. | 105/370 X |
| 4,149,472 | 4/1979 | Naves et al. | 105/370 X |

Primary Examiner—Howard Beltran
Attorney, Agent, or Firm—Richard J. Myers

[57] ABSTRACT

A vehicle carrying railway car including a plurality of vertically spaced decks having at least one hinged deck section adapted to be raised for facilitating the loading of vehicles onto the car. The hinged deck has shrouds that are supported and aligned by inter-reactive foot elements which are constantly shielded by the shrouds preventing injury to workmen moving the deck between its respective raised and lowered positions.

4 Claims, 5 Drawing Figures

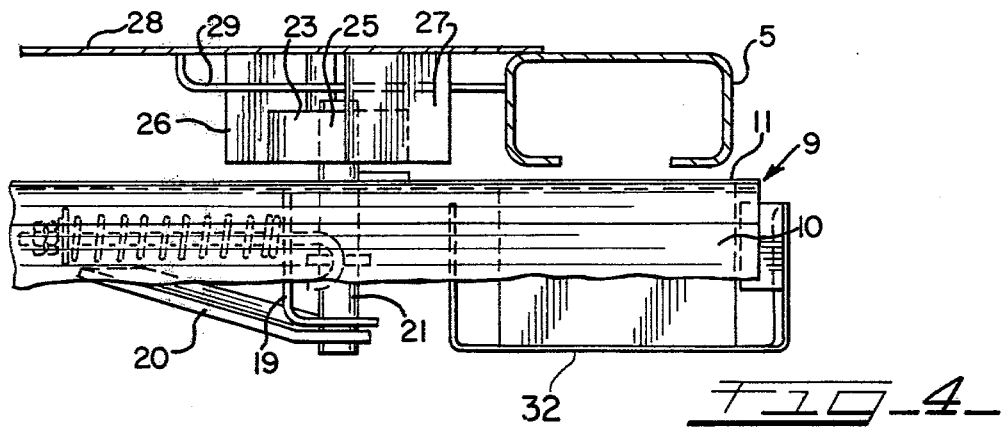
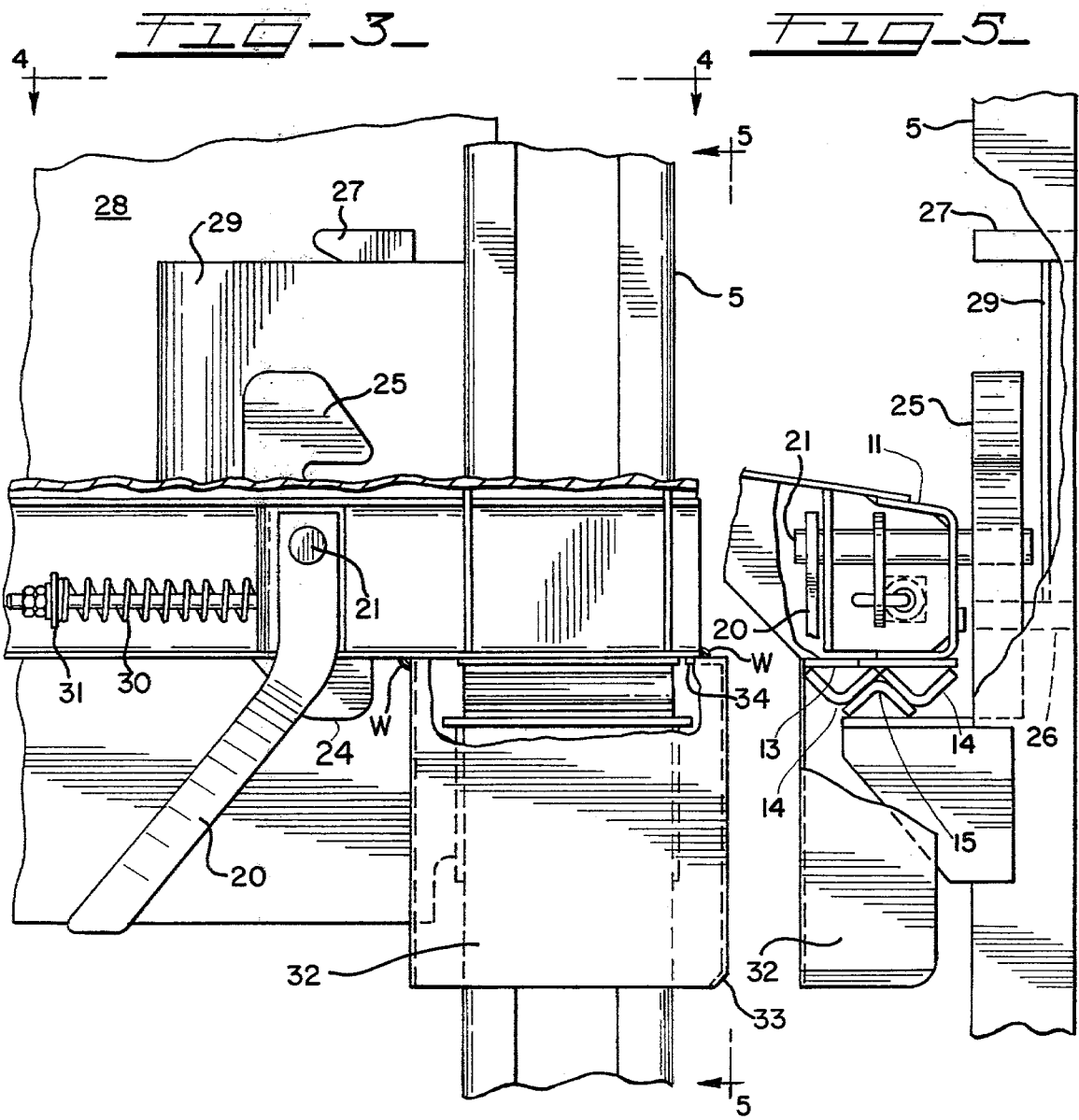

RAILWAY CAR COUNTER-BALANCED TILTING DECK

BACKGROUND OF THE INVENTION

1. Field of the Invention

This invention relates to railway freight cars and specifically to a latching and alignment device for a rack and decking arrangement for transporting automobiles or the like.

2. Description of the Prior Art

The prior art autorack deck latching and supporting structures are exemplified by U.S. Pat. Nos. 3,205,836, 3,426,704 and 3,866,543. The present invention is an improvement over those arrangements.

U.S. Pat. No. 3,205,836 discloses a multiple level railway car for transporting vehicles. The car includes movable decks and means for inhibiting lateral and longitudinal movement of the decks. U.S. Pat. No. 3,426,704 discloses a lock structure for use with movable decks of transport vehicles. U.S. Pat. No. 3,866,543 discloses multideck transport vehicles and control levers for movement of the decks.

SUMMARY OF THE INVENTION

The latching and deck alignment arrangement of the present invention is adapted for selectively retaining a hinged or movable intermediate deck such as disclosed in U.S. Pat. application Ser. No. 772,200 filed Feb. 25, 1977 issued as U.S. Pat. No. 4,119,042 and incorporated by reference herein in the raised or lowered positions. The invention provides for a latch and a longitudinally aligned V-shaped foot element on the movable deck section and that they be cooperative with latch keepers and a foot supporting element mounted on the upstanding side supporting structure of the car to retain the deck in its respective raised and lowered positions. The invention further provides for a shield or hood about the deck aligning foot elements to prevent injury to workmen operating the latch when moving the deck between its respective raised and lowered positions.

BRIEF DESCRIPTION OF THE DRAWINGS

FIG. 3 is a side elevational view of the structure shown in FIG. 1 showing the deck in the lowered position;

FIG. 4 is a plan sectional view taken substantially along lines 4—4 in FIG. 3; and FIG. 5 is an end elevational view taken substantially along lines 5—5 in FIG. 3.

DESCRIPTION OF THE PREFERRED EMBODIMENT

Figure 1:
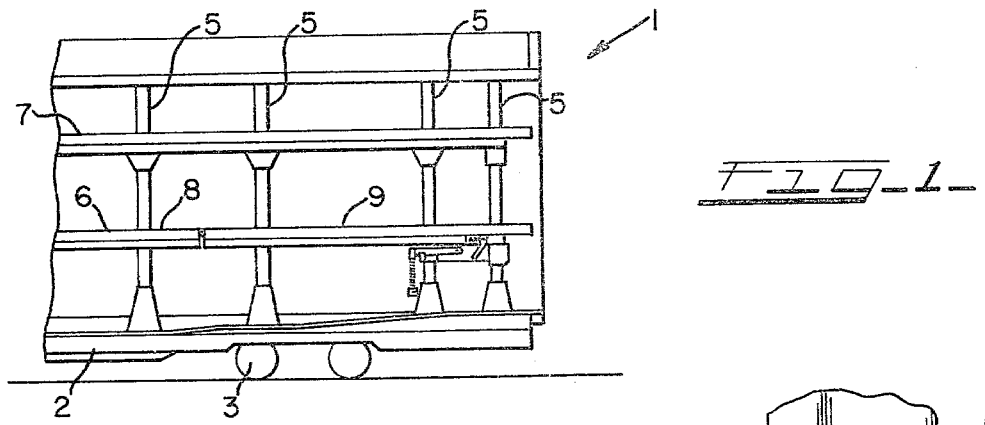
FIG. 1 is a side elevational view of an end portion of the railway car in which the present invention is embodied.

Turning now to consideration of the drawings, there is shown a railway car 1 particularly adapted for carrying automobiles and the like which includes an underframe 2 supported on conventional wheel trucks 3. The railway car 1 has a rack structure 4 supported thereon including a plurality of upright posts 5 which are spaced longitudinally along the car on laterally opposite sides thereof. The rack 4 is of multiple support construction including a first upper deck 6 and a second upper deck 7. The car is open at opposite ends and may be loaded by driving vehicles onto the floor and decks of the car. The first upper deck 6 comprises a rigid deck section 8 suitably supported on upright posts 5. A hinged second deck 9 is connected to each of the ends of the rigid deck section 8 (only one end shown in the drawings) and is hingedly movable with respct thereto by appropriate hinge brackets or other conventional means. Each of the deck sections 9 also comprises a platform 10 onto which automobiles are driven and are supported at opposite sides by longitudinal extending channels 11 and stringers (not shown) as discussed in U.S. Pat. application Ser. No. 772,200 filed Feb. 25, 1977 issued as U.S. Pat. No. 4,119,042 and incorporated by reference hereto.

Figure 2:
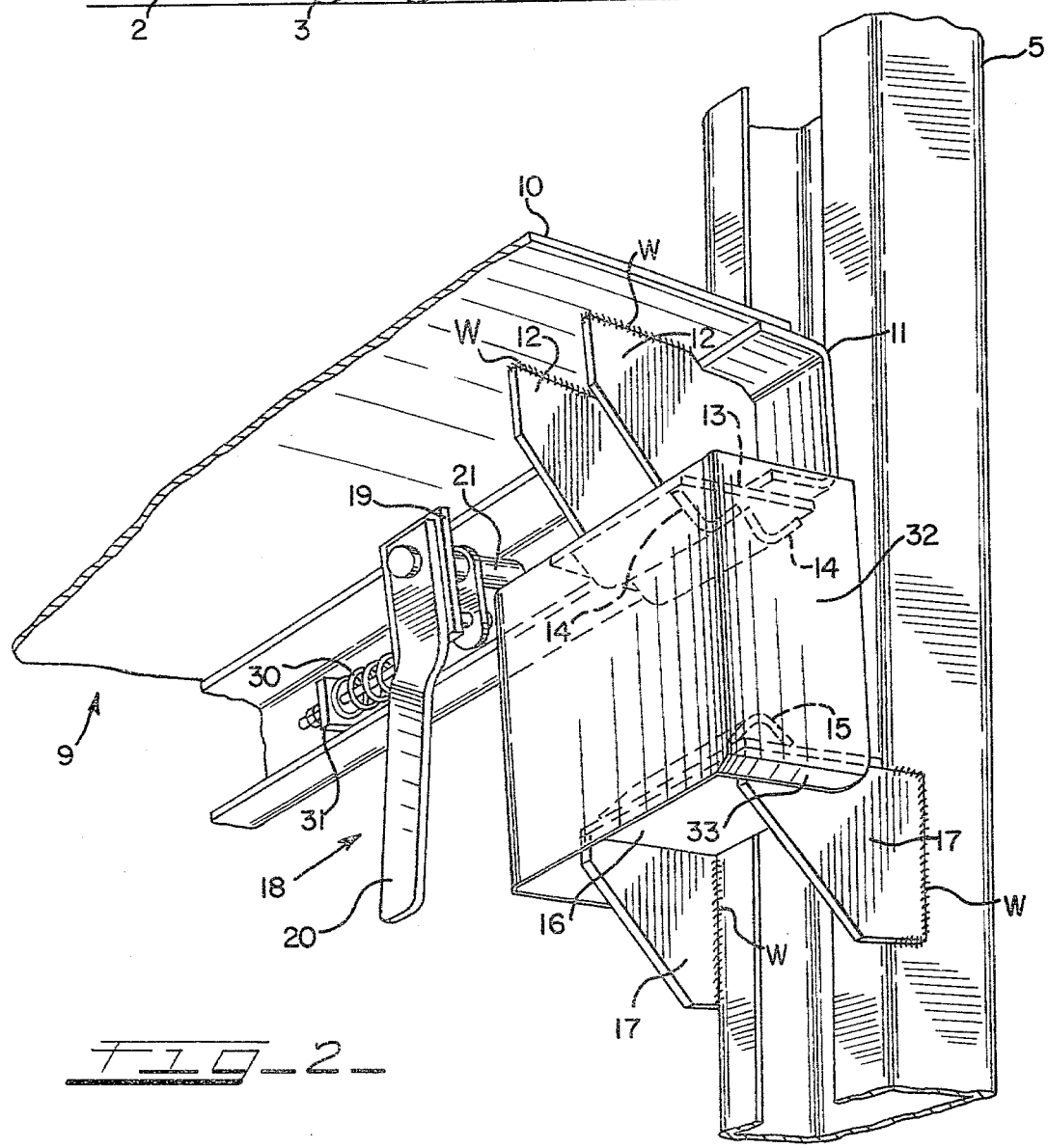
FIG. 2 is a perspective view showing the side of the deck and the side supporting post of the car when the deck is in the raised position.

The ends of the hinged deck section 9 are supported on the posts 5 so that the hinged deck in its lower position is in substantially linear relation with respect to the rigid deck 8. Reinforcing gussets 12 are suitably connected by welding w or the like to the channels 11 to reinforce same, and, as shown in FIGS. 2-5, at the outer ends thereof a plate 13 is secured having a plurality of downwardly extending V-shaped foot elements 14 providing a socket for engaging and seating upon an inverted V-shaped element 15 on the seat plate 16 suitably supported on brackets 17 secured by welding and cantilevered from the post 5. Thus, in the lowered position the outer ends of the deck 9 are firmly seated on seats 16 and supported on the side posts 5.

A locking arrangement 18 is provided to secure the hinged second deck 9 in its respective raised or lowered positions. The locking arrangement 18 includes a housing 19 which is supported within the channel 11 by welding w proximate to the side post 5 supporting the outer end of the deck 9. A lever 20 is rigidly connected to a shaft 21 which is pivotally mounted within the housing 19. The shaft 21 is rigidly connected to a vertically extending latch arm 23 having at its lower end a hook-shaped keeper engaging member 24 extending in one direction and at its upper end another similar keeper engaging member 25 extending in an opposite direction. The keeper members 26 and 27 are appropriately vertically spaced and secured to the side post 5 and side wall or panel 28 by a bracket or plate 29 appropriately secured thereto. A spring assembly 30 supported on a spring bracket 31 urges the latch arm 23 into upper or lower keeper engaging positions as desired to secure the second deck in the raised or lowered positions, respectively.

The invention further provides a hood or shroud 32 secured to the plate 13 and the channel 11 which depends therefrom to enclose the inter-reactive elements 14 and 15 and thus assure the safe operation of the movable deck. The hood 32 is a channel shaped member and includes a rigidifying bent portion 33 at its outer lower edge and an inwardly extending supporting tab 34 at its upper outer edge secured to the channel by welding w.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a transportation device for vehicles including a body having a lower vehicle supporting floor, a plurality of longitudinally spaced upright rack posts connected to said body on opposite sides of said floor, a deck supported on said side posts in vertically spaced relation above said floor including a first vehicle carrying section rigidly connected to said posts and a second vehicle carrying section having a floor and hinge means connected to one end of said second vehicle carrying section and to said first vehicle carrying section whereby the other end of said second vehicle carrying section may be swung upwardly between a lowered vehicle carrying position and a raised position; the improvement comprising:

alignment means for said second vehicle carrying section including a pair of downwardly opening socket elements, each depending from said other end at opposite sides of the second vehicle carrying section, and upstanding foot elements cantilevered from laterally opposite posts adjacent said socket elements and engageable therein to support and align the second vehicle carrying section in the lowered position, a shroud member for each pair of operatively associated foot and socket elements, said shroud member reinforceingly connected with and depending from said other end of said second vehicle carrying section about said elements and cooperative with a respective adjacent post to enclose said elements as the second vehicle carrying section is moved from the raised position to the lowered position and vice versa, and said shroud member having a vertical length extending below the associated foot element in the elevated position of the second vehicle carrying section as well as in the lower position whereby said alignment means is constantly shielded in all positions of said second vehicle carrying section.

2. The invention in accordance with the claim 1, and said socket element having a plurality of adjacent downwardly extending V-shaped members and said foot element having at least one inverted V-shaped member engageable therebetween, and said shroud being generally channel-shaped in horizontal cross-section and means supporting said V-shaped members including a mounting plate positioned generally parallel with said floor and the upper edge portion of the shroud and the peripheral edge of said mounting plate bearing against each other.

3. The invention in accordance with claim 2, and said shroud having a lower rigidifying bent portion extending laterally thereof.

4. The invention according to claim 2, and said channel shape having an open side facing the adjacent post and having sidewalls in close proximity to the opposing side of the adjacent post.

* * * * *